US012794130B2

(12) United States Patent
Komura

(10) Patent No.: US 12,794,130 B2
(45) Date of Patent: Nov. 10, 2026

(54) ANTENNA MODULE AND COMMUNICATION DEVICE EQUIPPED WITH THE SAME

(71) Applicant: Murata Manufacturing Co., Ltd., Nagaokakyo (JP)

(72) Inventor: Ryo Komura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 19/191,060

(22) Filed: Apr. 28, 2025

(65) Prior Publication Data

US 2025/0260169 A1 Aug. 14, 2025

Related U.S. Application Data

(63) Continuation of application No. PCT/JP2023/033504, filed on Sep. 14, 2023.

(30) Foreign Application Priority Data

Dec. 2, 2022 (JP) ................................ 2022-193790

(51) Int. Cl.
*H01Q 21/24* (2006.01)
*H01Q 1/22* (2006.01)
*H01Q 9/04* (2006.01)

(52) U.S. Cl.
CPC ........... *H01Q 9/045* (2013.01); *H01Q 1/2208* (2013.01); *H01Q 1/2283* (2013.01)

(58) Field of Classification Search
CPC .... H01Q 9/045; H01Q 1/2208; H01Q 1/2283; H01Q 1/523; H01Q 5/378; H01Q 9/0414; H01Q 25/001; H01Q 21/24
See application file for complete search history.

(56) References Cited

U.S. PATENT DOCUMENTS

2021/0028546 A1* 1/2021 Yamada .................. H04B 1/48
2021/0126366 A1* 4/2021 Sudo .................... H01Q 1/2208
2021/0367358 A1* 11/2021 He ....................... H01Q 25/001

FOREIGN PATENT DOCUMENTS

WO 2017/100126 A1 6/2017

OTHER PUBLICATIONS

International Search Report and Written Opinion mailed on Nov. 28, 2023, received for PCT Application PCT/JP2023/033504, filed on Sep. 14, 2023, 9 pages including English Translation.

* cited by examiner

*Primary Examiner* — David E Lotter
(74) *Attorney, Agent, or Firm* — XSENSUS LLP

(57) ABSTRACT

An antenna module includes a dielectric substrate, a ground electrode disposed in the dielectric substrate, flat-plate-shaped radiating elements, feed lines, and a via electrode connected to the ground electrode. The radiating element is disposed opposite the ground electrode in the dielectric substrate. The radiating element is disposed between the radiating element and the ground electrode. The feed line extends through the radiating element and transmits a radio-frequency signal to the radiating element. The feed line transmits a radio-frequency signal to the radiating element. The feed line is electrically coupled to the radiating element at a position offset from a center of the radiating element in a first direction. The feed line is electrically coupled to the radiating element at a position offset from a center of the radiating element in a second direction different from the first direction.

20 Claims, 10 Drawing Sheets

ANTENNA MODULE AND COMMUNICATION DEVICE EQUIPPED WITH THE SAME

CROSS-REFERENCE TO RELATED APPLICATIONS

The present application is a continuation of International Application PCT/JP2023/033504, filed Sep. 14, 2023, which contains subject matter related to Japanese priority document JP 2022-193790, filed Dec. 2, 2022, the entire contents of each of which being incorporated by reference.

TECHNICAL FIELD

The present disclosure relates to an antenna module and a communication device equipped with the same and, more specifically, to a technique for improving isolation in the antenna module.

BACKGROUND ART

U.S. Patent Application Publication No. 2021/0367358 (Patent Document 1) discloses a dual-band, dual-polarization patch antenna that can radiate two different radio waves and radiate radio waves in two different polarization directions. In the patch antenna, to improve isolation between feed pins for respective radiating elements, a ground pin is connected to the central portions of two stacked radiating elements.

CITATION LIST

Patent Document

Patent Document 1: U.S. Patent Application Publication No. 2021/0367358

SUMMARY

Technical Problems

Antenna modules, such as that described above, may be used in mobile communication devices, typified by mobile phones or smartphones. In such mobile communication devices, communication using radio waves in a plurality of frequency bands is conducted to improve communication quality and communication speed. Meanwhile, and among other things, the need for improved antenna characteristics remains high, and there is demand for further improvement in isolation between different frequency bands.

The present disclosure has been made to deal with such an issue, as well as other issues, and aims to improve isolation between feed ports in a dual-band antenna module.

Solutions to Problems

As a non-limiting example, an antenna module according to a first aspect of the present disclosure includes a dielectric substrate, a ground electrode disposed in the dielectric substrate, a flat-plate-shaped first radiating element, a flat-plate-shaped second radiating element, a first feed line, a second feed line, and a via electrode connected to the ground electrode. The first radiating element is disposed opposite the ground electrode in the dielectric substrate. The second radiating element is disposed between the first radiating element and the ground electrode. The first feed line extends through the second radiating element and conveys a radio-frequency signal to the first radiating element. The second feed line conveys a radio-frequency signal to the second radiating element. The first feed line is electrically coupled to the first radiating element at a position offset from a center of the first radiating element in a first direction. The second feed line is electrically coupled to the second radiating element at a position offset from a center of the second radiating element in a second direction different from the first direction. A size of the second radiating element is larger than a size of the first radiating element. An opening portion is formed in a central portion of the second radiating element. The via electrode extends through the opening portion of the second radiating element and is electrically coupled to a central portion of the first radiating element.

An antenna module according to a second aspect of the present disclosure includes a dielectric substrate, a ground electrode disposed in the dielectric substrate, a flat-plate-shaped first radiating element, a flat-plate-shaped second radiating element, a first feed line, a second feed line, and a via electrode connected to the ground electrode. The first radiating element is disposed opposite the ground electrode in the dielectric substrate. The second radiating element is disposed between the first radiating element and the ground electrode. The first feed line extends through the second radiating element and conveys a radio-frequency signal to the first radiating element. The second feed line conveys a radio-frequency signal to the second radiating element. The first feed line is electrically coupled to the first radiating element at a position offset from a center of the first radiating element in a first direction. The second feed line is electrically coupled to the second radiating element at a position offset from a center of the second radiating element in a second direction different from the first direction. A size of the second radiating element is larger than a size of the first radiating element. An opening portion is formed in a central portion of the second radiating element. The via electrode extends through the opening portion of the second radiating element.

An antenna module according to a third aspect of the present disclosure includes a dielectric substrate, a ground electrode disposed in the dielectric substrate, a flat-plate-shaped first radiating element, a flat-plate-shaped second radiating element, a first feed line, a second feed line, and a via electrode having a first end portion and a second end portion. The first radiating element is disposed opposite the ground electrode in the dielectric substrate. The second radiating element is disposed between the first radiating element and the ground electrode. The first feed line extends through the second radiating element and conveys a radio-frequency signal to the first radiating element. The second feed line conveys a radio-frequency signal to the second radiating element. The first feed line is electrically coupled to the first radiating element at a position offset from a center of the first radiating element in a first direction. The second feed line is electrically coupled to the second radiating element at a position offset from a center of the second radiating element in a second direction different from the first direction. A size of the second radiating element is larger than a size of the first radiating element. An opening portion is formed in a central portion of the second radiating element. The first end portion of the via electrode is connected to the ground electrode. The second end portion of the via electrode is in a position of the second radiating element or in a position between the second radiating element and the first radiating element in a normal direction of the dielectric substrate. When viewed in plan from the normal direction of the dielectric substrate, the second end portion overlaps the opening portion.

Advantageous Effects of Disclosure

The antenna module according to the present disclosure includes two stacked radiating elements, and a radio-frequency signal to a high frequency-side radiating element (first radiating element) passes through a low frequency-side radiating element (second radiating element) and is transmitted to the first radiating element. The via electrode connected to the ground electrode extends through the opening portion formed in the central portion of the second radiating element and is electrically coupled to the central portion of the first radiating element. Such a configuration changes a current distribution in the second radiating element. Specifically, when a radio-frequency signal is fed to the first radiating element, current concentrates around the opening portion in the central portion in the second radiating element. This reduces the current flowing from the feed line going to the first radiating element to a feed point of the second radiating element in comparison with a case where there is no via electrode. This can improve isolation between feed ports.

DESCRIPTION OF EMBODIMENTS

Figure 1:
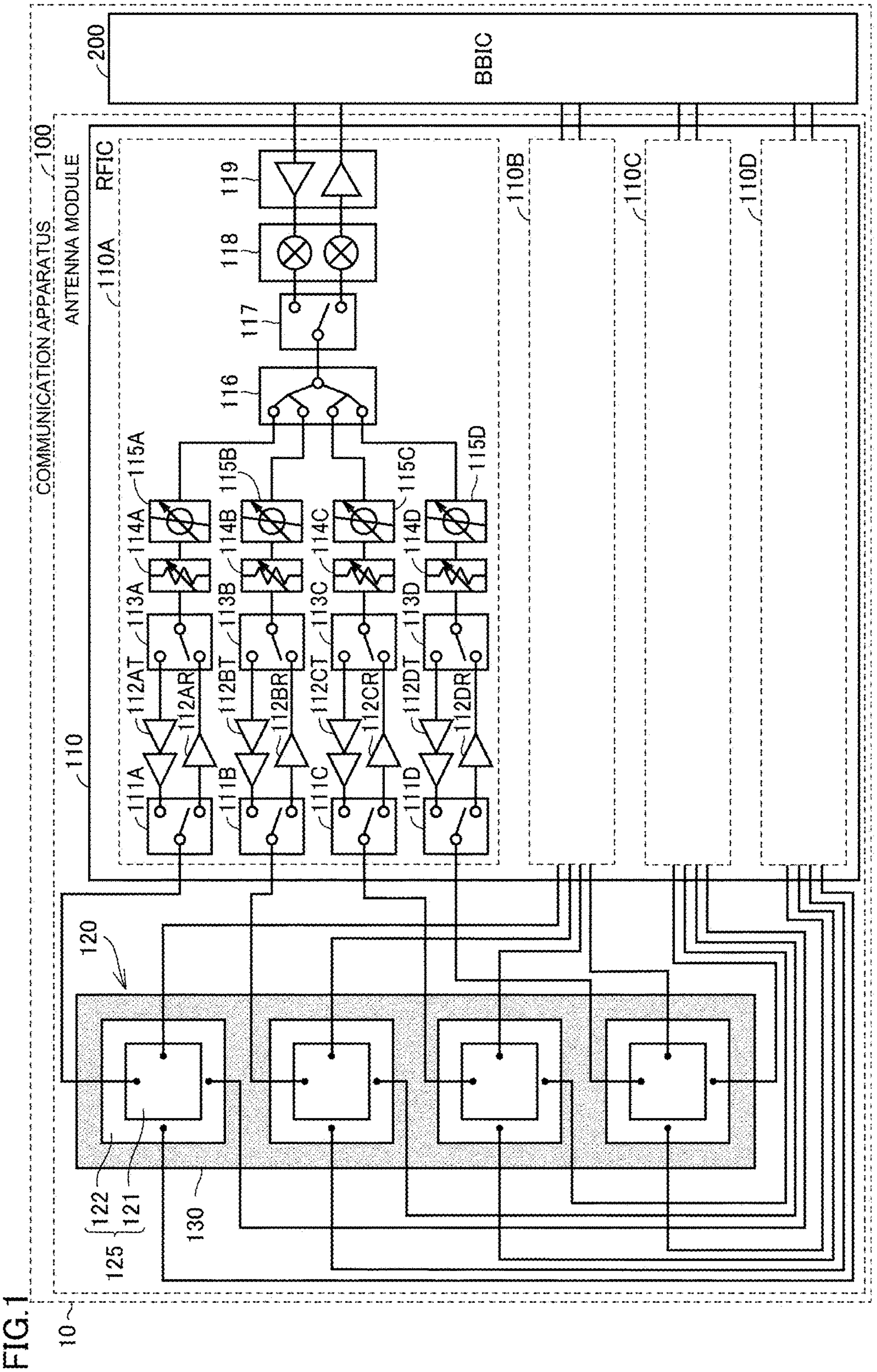
FIG. 1 is a block diagram of a communication device in which an antenna module according to Embodiment 1 is used.

Hereinafter, embodiments of the present disclosure will be described in detail with reference to the drawings. The same or corresponding components in the drawings are denoted by the same reference numerals, and the description thereof is not repeated.

Embodiment 1

(Basic Configuration of Communication Device)

FIG. 1 is a block diagram of a communication device 10 in which an antenna module 100 according to this embodiment is used. The communication device 10 is, for example, a mobile terminal, such as a mobile phone, smartphone, or tablet, or a personal computer having a communication function. Although examples of a frequency band of radio waves used in the antenna module 100 according to this embodiment include radio waves in millimeter-wave bands with center frequencies of, for example, 28 GHz, 39 GHz, and 60 GHz, radio waves in a frequency band other than the above-described bands can also be used.

Referring to FIG. 1, the communication device 10 includes the antenna module 100, and a BBIC 200, which is a baseband signal processing circuit. The antenna module 100 includes a radio frequency IC (RFIC) 110, which is an example of a feed device, and an antenna device 120. The communication device 10 up-converts an intermediate frequency signal transmitted from the BBIC 200 to the antenna module 100 into a radio-frequency signal and radiates the radio-frequency signal from the antenna device 120. Also, the communication device 10 down-converts a radio-frequency signal received by the antenna device 120 into an intermediate frequency signal and processes the signal in the BBIC 200. In this context, the communication apparatus 100 is a transceiver, with receiver and transmitter components.

The antenna device 120 includes a dielectric substrate 130, and a plurality of antenna elements 125 disposed in the dielectric substrate 130. Although FIG. 1 illustrates an example of an array configuration in which four antenna elements 125 are disposed in a line in the dielectric substrate 130, the number of antenna elements 125 is not limited to this. In the dielectric substrate 130, a single antenna element 125 may be disposed, or a plurality of antenna elements 125 other than four antenna elements 125 may be disposed. Alternatively, the antenna elements 125 may be arranged in a two-dimensional array configuration.

Each antenna element 125 includes flat-plate-shaped radiating elements 121 and 122 that are different in size from each other. The radiating elements 121 and 122 are flat-plate-shaped patch antennas of circular, elliptical, or polygonal shape. In Embodiment 1, as an example, a case will be described where each radiating element is a microstrip antenna of substantially square shape. As described later with reference to FIGS. 2 to 4, in the dielectric substrate 130, the radiating elements 121 and 122 are disposed in a stacked configuration so as to be spaced away from each other in a normal direction of the dielectric substrate 130.

The size of the radiating element 121 is smaller than the size of the radiating element 122. For this reason, a frequency band of a radio wave radiated from the radiating element 121 is higher than a frequency band of a radio wave radiated from the radiating element 122. That is, the antenna module 100 is a so-called dual-band antenna module capable of radiating radio waves in two different frequency bands. In an example in Embodiment 1, the frequency band of a radio wave radiated from the radiating element 121 is a 39 GHz band (37.0 GHz to 43.5 GHz), and the frequency band of a radio wave radiated from the radiating element 122 is a 28 GHz band (24.25 GHz to 29.5 GHz).

Furthermore, in each of the radiating elements 121 and 122, two feed points offset from an element center in different directions are disposed, and a radio-frequency signal is fed from the RFIC 110 to each feed point. That is, the antenna module 100 is a so-called dual-polarization antenna module capable of radiating radio waves in two different polarization directions. In the example in Embodiment 1, each of the radiating elements 121 and 122 is configured to be capable of radiating radio waves in two polarization directions (first polarization direction, second polarization direction) that are orthogonal to each other.

The RFIC 110 includes four feed circuits 110A to 110D. The feed circuit 110A is a circuit that feeds a radio-frequency signal for the first polarization direction of the radiating element 121. The feed circuit 110B is a circuit that feeds a radio-frequency signal for the second polarization direction of the radiating element 121. The feed circuit 110C is a circuit that feeds a radio-frequency signal for the first polarization direction of the radiating element 122. The feed circuit 110D is a circuit that feeds a radio-frequency signal for the second polarization direction of the radiating element 122. Note that the feed circuits 110A to 110D have the same internal configuration. Thus, FIG. 1 illustrates a detailed configuration of only the feed circuit 110A for ease of explanation, and configurations of the feed circuits 110B to 110D are omitted. For illustration purposes, an exemplary function of the feed circuit 110A will be described below.

The feed circuit 110A includes switches 111A to 111D, 113A to 113D, and 117, power amplifiers 112AT to 112DT, low noise amplifiers 112AR to 112DR, attenuators 114A to 114D, phase shifters 115A to 115D, a signal combiner/splitter 116, a mixer 118, and an amplifier circuit 119.

When a radio-frequency signal is transmitted, the switches 111A to 111D and 113A to 113D are switched to power amplifiers 112AT to 112DT sides, and the switch 117 is connected to a transmission-side amplifier of the amplifier circuit 119. When a radio-frequency signal is received, the switches 111A to 111D and 113A to 113D are switched to low noise amplifiers 112AR to 112DR sides, and the switch 117 is connected to a reception-side amplifier of the amplifier circuit 119.

An intermediate frequency signal transmitted from the BBIC 200 is amplified by the amplifier circuit 119 and is up-converted by the mixer 118. A transmission signal that is an up-converted radio-frequency signal is split into four signals by the signal combiner/splitter 116, and the signals pass through their corresponding signal paths and are fed as power to the respective different radiating elements 121. The directivities of radio waves output from the radiating elements 121 can be adjusted by adjusting the degrees of phase shift of the phase shifters 115A to 115D disposed in the respective signal paths individually. Furthermore, the attenuators 114A to 114D adjust the intensity of a transmission signal.

Reception signals that are radio-frequency signals received by the respective radiating elements 121 are transmitted to the feed circuit 110A of the RFIC 110, pass through four different signal paths, and are combined in the signal combiner/splitter 116. The combined reception signal is down-converted into an intermediate frequency signal by the mixer 118, then amplified by the amplifier circuit 119, and transmitted to the BBIC 200.

The RFIC 110 is formed as, for example, a single-chip integrated circuit component including the above-described circuit configuration. Alternatively, the RFIC 110 may be formed as an individual integrated circuit component for each feed circuit. Furthermore, devices (switch, power amplifier, low noise amplifier, attenuator, and phase shifter) corresponding to each radiating element may be formed as a single-chip integrated circuit component for the corresponding radiating element.

(Structure of Antenna Module)

Figure 2:
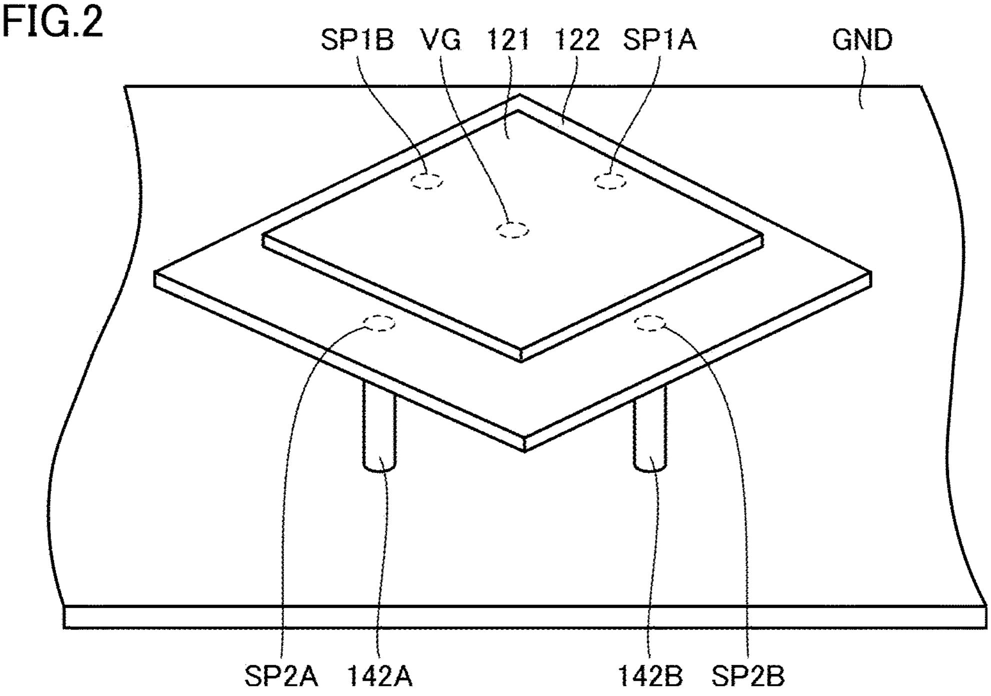
FIG. 2 is a perspective view of the antenna module illustrated in FIG. 1.
Figure 3:
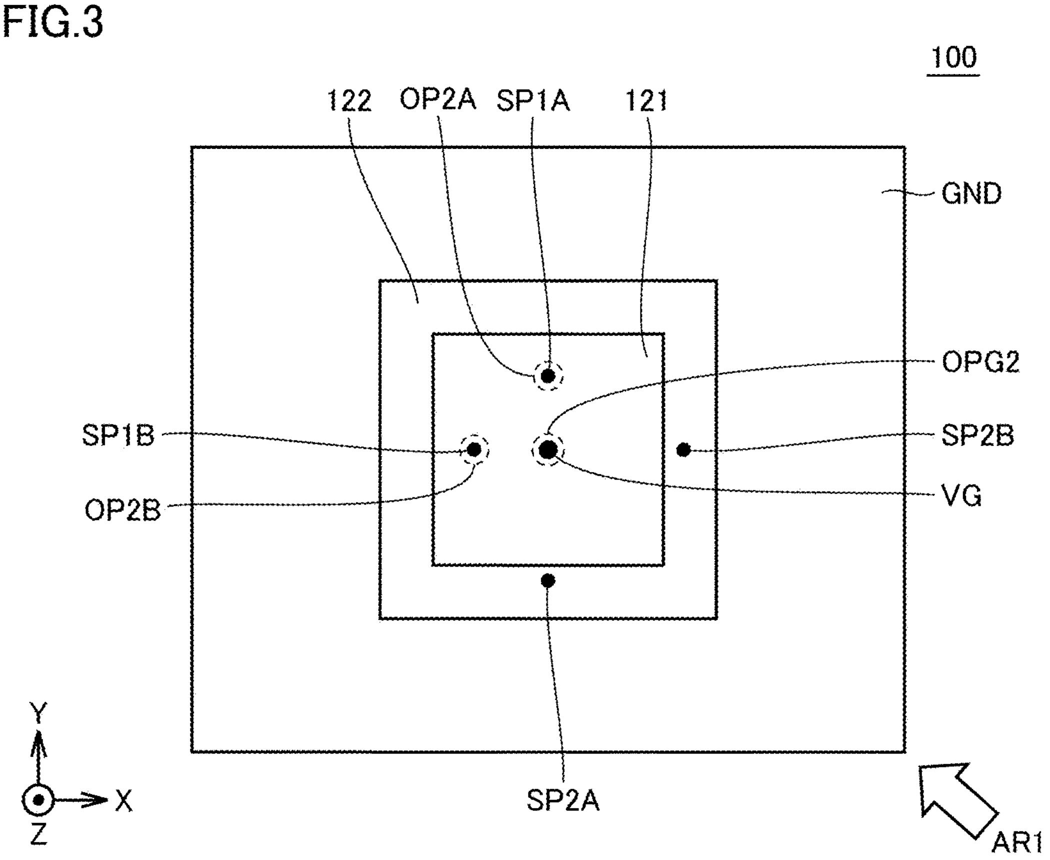
FIG. 3 is a plan view of the antenna module illustrated in FIG. 1.
Figure 4:
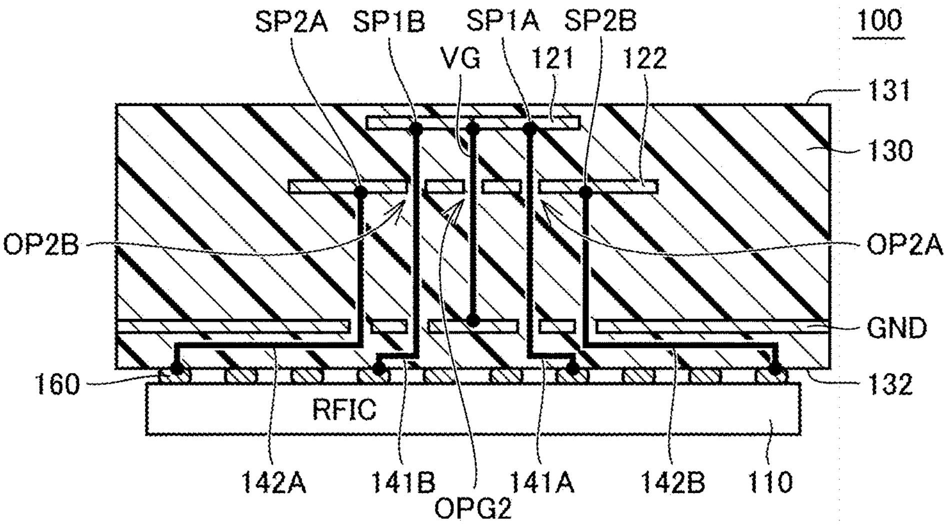
FIG. 4 is a side perspective view of the antenna module illustrated in FIG. 3 as viewed from an arrow AR1.

Next, a configuration of the antenna module 100 according to Embodiment 1 will be described in detail with reference to FIGS. 2 to 4. FIG. 2 is a perspective view of the antenna module 100 according to Embodiment 1. FIG. 3 is a plan view of the antenna module 100 as viewed from the normal direction of the dielectric substrate 130. FIG. 4 is a side perspective view of the antenna module 100 as viewed from a direction of an arrow AR1 in FIG. 3.

Note that FIGS. 2 and 3 illustrate an internal configuration with a dielectric of the dielectric substrate 130 being removed for ease of understanding. Furthermore, as illustrated in FIG. 3, the normal direction of the dielectric substrate 130 and radiating elements 121 and 122 is a Z-axis direction, a direction along one side of two adjacent sides of the radiating elements 121 and 122 is an X axis, and a direction along the other side is a Y axis. In each figure, in some cases, a positive direction of a Z axis may be referred to as an upper side, and a negative direction may be referred to as a lower side.

Referring to FIGS. 2 to 4, the antenna module 100 further includes feed lines 141A, 141B, 142A, and 142B, a ground electrode GND, and a via electrode VG, in addition to the RFIC 110, the antenna element 125, and the dielectric substrate 130.

The dielectric substrate 130 is, for example, a Low Temperature Co-fired Ceramics (LTCC) multilayer substrate, a multilayer resin substrate formed by laminating a plurality of resin layers made of resin, such as epoxy or polyimide, a multilayer resin substrate formed by laminating a plurality of resin layers made of a Liquid Crystal Polymer (LCP) having a lower dielectric constant, a multilayer resin substrate formed by laminating a plurality of resin layers made of fluorine-based resin, a multilayer resin substrate formed by laminating a plurality of resin layers made of a polyethylene terephthalate (PET) material, or a ceramic multilayer substrate other than LTCC. Note that the dielectric substrate 130 does not necessarily have a multilayer structure and may be a single-layer substrate.

At a position close to an upper surface 131 of the dielectric substrate 130, the radiating element 121 is disposed. The radiating element 121 may be disposed so as to be exposed at the surface of the dielectric substrate 130, or may be disposed at an inner layer of the dielectric substrate 130 as illustrated in an example in FIG. 4. At a position close to a lower surface 132 of the dielectric substrate 130, the ground electrode GND is disposed over the entire surface of the dielectric substrate 130. The radiating element 121 is disposed opposite the ground electrode. Furthermore, the RFIC 110 is mounted on the lower surface 132 of the dielectric substrate 130 with solder bumps 160. Note that the RFIC 110 may be mounted on the dielectric substrate 130 by using a connector disposed in the RFIC 110 in place of the solder bumps. Alternatively, the RFIC 110 may be disposed in or on a wiring board of a device where the antenna module 100 is installed and feed a radio-frequency signal from there to a radiating element via a connector.

The radiating element 122 is disposed between the radiating element 121 and the ground electrode GND in the dielectric substrate 130. The radiating element 122 is disposed opposite the dielectric substrate 130 and the radiating element 121. When the dielectric substrate 130 is viewed in plan from the normal direction as illustrated in FIG. 3, the radiating elements 121 and 122 are disposed such that the element centers coincide with each other and they overlap each other.

Radio-frequency signals are fed from the RFIC 110 to the radiating element 121 via the feed lines 141A and 141B. The feed line 141A extends from the RFIC 110 to a position under the radiating element 121 in a dielectric layer on a lower surface 132 side below the ground electrode GND, then extends through the ground electrode GND and an opening portion OP2A of the radiating element 122, and is connected to a feed point SP1A of the radiating element 121. Similarly, the feed line 141B extends from the RFIC 110 to a position under the radiating element 121 in the dielectric layer on the lower surface 132 side below the ground electrode GND, then extends through the ground electrode GND and an opening portion OP2B of the radiating element 122, and is connected to a feed point SP1B of the radiating element 121.

As illustrated in FIG. 3, the feed point SP1A is offset from the element center of the radiating element 121 in a positive direction of the Y axis. When a radio-frequency signal is fed to the feed point SP1A, a radio wave with a polarization direction along the Y axis is radiated from the radiating element 121 in the Z-axis direction. Furthermore, the feed point SP1B is offset from the element center of the radiating element 121 in a negative direction of the X axis. When a radio-frequency signal is fed to the feed point SP1B, a radio wave with a polarization direction along the X axis is radiated from the radiating element 121 in the Z-axis direction.

Radio-frequency signals are fed from the RFIC 110 to the radiating element 122 via the feed lines 142A and 142B. The feed line 142A extends from the RFIC 110 to a position under the radiating element 122 in the dielectric layer on the lower surface 132 side below the ground electrode GND, then extends through the ground electrode GND, and is connected to a feed point SP2A of the radiating element 122. Similarly, the feed line 142B extends from the RFIC 110 to a position under the radiating element 122 in the dielectric layer on the lower surface 132 side below the ground electrode GND, then extends through the ground electrode GND, and is connected to a feed point SP2B of the radiating element 122.

As illustrated in FIG. 3, the feed point SP2A is offset from the element center of the radiating element 122 in a negative direction of the Y axis. When a radio-frequency signal is fed to the feed point SP2A, a radio wave with a polarization direction along the Y axis is radiated from the radiating element 122 in the Z-axis direction. Furthermore, the feed point SP2B is offset from the element center of the radiating element 122 in a positive direction of the X axis. When a radio-frequency signal is fed to the feed point SP2B, a radio wave with a polarization direction along the X axis is radiated from the radiating element 122 in the Z-axis direction.

The via electrode VG connects the ground electrode GND and the radiating element 121. In other words, a lower-side end portion (first end portion) of the via electrode VG is connected to the ground electrode GND, and an upper-side end portion (second end portion) of the via electrode VG is connected to the radiating element 121. The via electrode VG extends through an opening portion OPG2 formed in a central portion of the radiating element 122 from the ground electrode GND and is connected to the center of the radiating element 121. Note that, in the opening portion OPG2, the via electrode VG is not in contact with the radiating element 122.

(Antenna Characteristics)

In a stack-type antenna module, such as that described above, when radio-frequency signals are fed to the high frequency-side radiating element 121 via the feed lines 141A and 141B, current also flows to the radiating element 122 functioning as a ground electrode for the radiating element 121. At this time, in the radiating element 122, when current flows to paths connecting the opening portions OP2A and OP2B of the radiating element 122 through which the feed lines 141A and 141B extend and the feed points SP2A and SP2B of the radiating element 122, coupling may be generated between a high frequency-side feed path and a low frequency-side feed path, and isolation characteristics may decrease.

Here, in the antenna module 100 according to Embodiment 1, as described above, the via electrode VG connected to the center of the radiating element 121 extends through the opening portion OPG2 formed in the central portion of the radiating element 122 and is connected to the ground electrode GND. When the via electrode VG at a ground potential is adjacent to the opening portion OPG2 without being in contact with the opening portion OPG2 in this way, a capacitor is formed between an edge portion of the opening portion OPG2 and the via electrode VG, and thus current concentrates at the edge portion of the opening portion OPG2. In particular, for radio-frequency signals, current is likely to concentrate at an edge portion of a conductor due to edge effects, and thus the above-described disposition of the via electrode VG facilitates the concentration of current at the edge portion of the opening portion OPG2.

This changes a current distribution on the radiating element 122. A current density increases at edge portions of the opening portions OP2A and OP2B through which the feed lines 141A and 141B extend and the opening portion OPG2 through which the via electrode VG extends, as well as between these opening portions, and a current density in the other portions relatively decreases. As a result, in comparison with a case where there is no via electrode VG, current that flows to paths connecting the opening portions OP2A and OP2B of the radiating element 122 through which the feed lines 141A and 141B extend and the feed points SP2A and SP2B of the radiating element 122 decreases, enabling an improvement in isolation between feed ports in different frequency bands.

Figure 5:
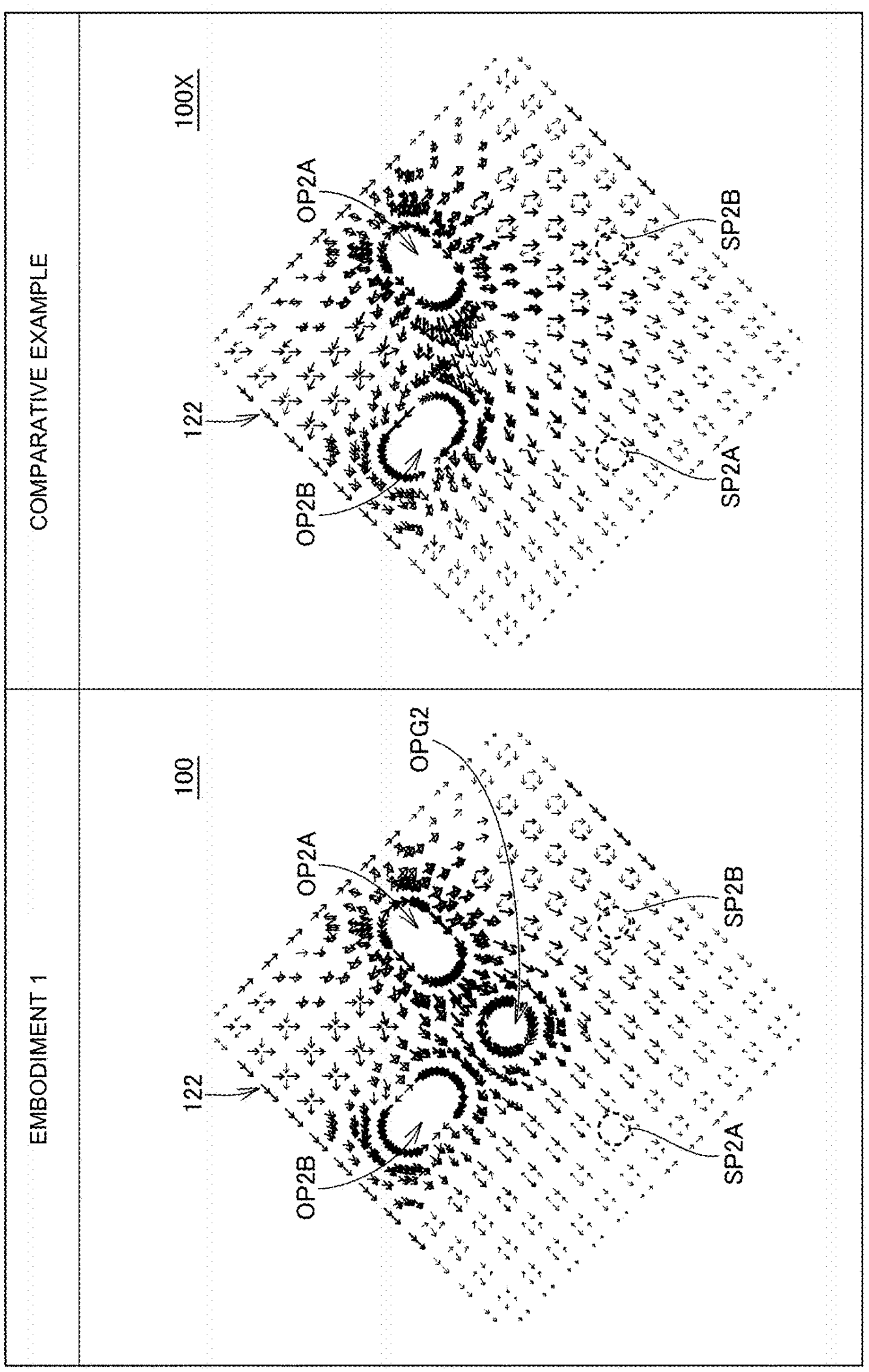
FIG. 5 includes diagrams illustrating a current distribution in a low frequency-side radiating element exhibited when power is fed to a high frequency-side radiating element in antenna modules according to Embodiment 1 and Comparative Example 1.

FIG. 5 includes diagrams illustrating examples of simulations of a current distribution in the low frequency-side radiating element 122 exhibited when power is fed to the high frequency-side radiating element 121 in the antenna module 100 according to Embodiment 1 and an antenna module 100X according to Comparative Example 1 including no via electrode VG. In FIG. 5, an arrow marked in the plane of the radiating element 122 indicates a direction of current, and the size of the arrow indicates the intensity of the current.

As illustrated in FIG. 5, in Comparative Example 1, current intensity around the opening portions OP2A and OP2B through which the feed lines 141A and 141B extend is high, and current between the opening portions OP2A and OP2B is somewhat strong.

On the other hand, in the configuration in Embodiment 1, current intensity is large at the edge portion of the opening portion OPG2 through which the via electrode VG passes in addition to the opening portions OP2A and OP2B. That is, current concentrates in proximity to and around the opening portions OP2A and OP2B and opening portion OPG2 of the radiating element 122. Furthermore, along with this, a direction of current flowing in the vicinity of the feed points SP2A and SP2B of the radiating element 122 changes, and current intensity is somewhat low. That is, isolation between the feed lines 141A and 141B and the feed lines 142A and 142B is improved.

Figure 6:
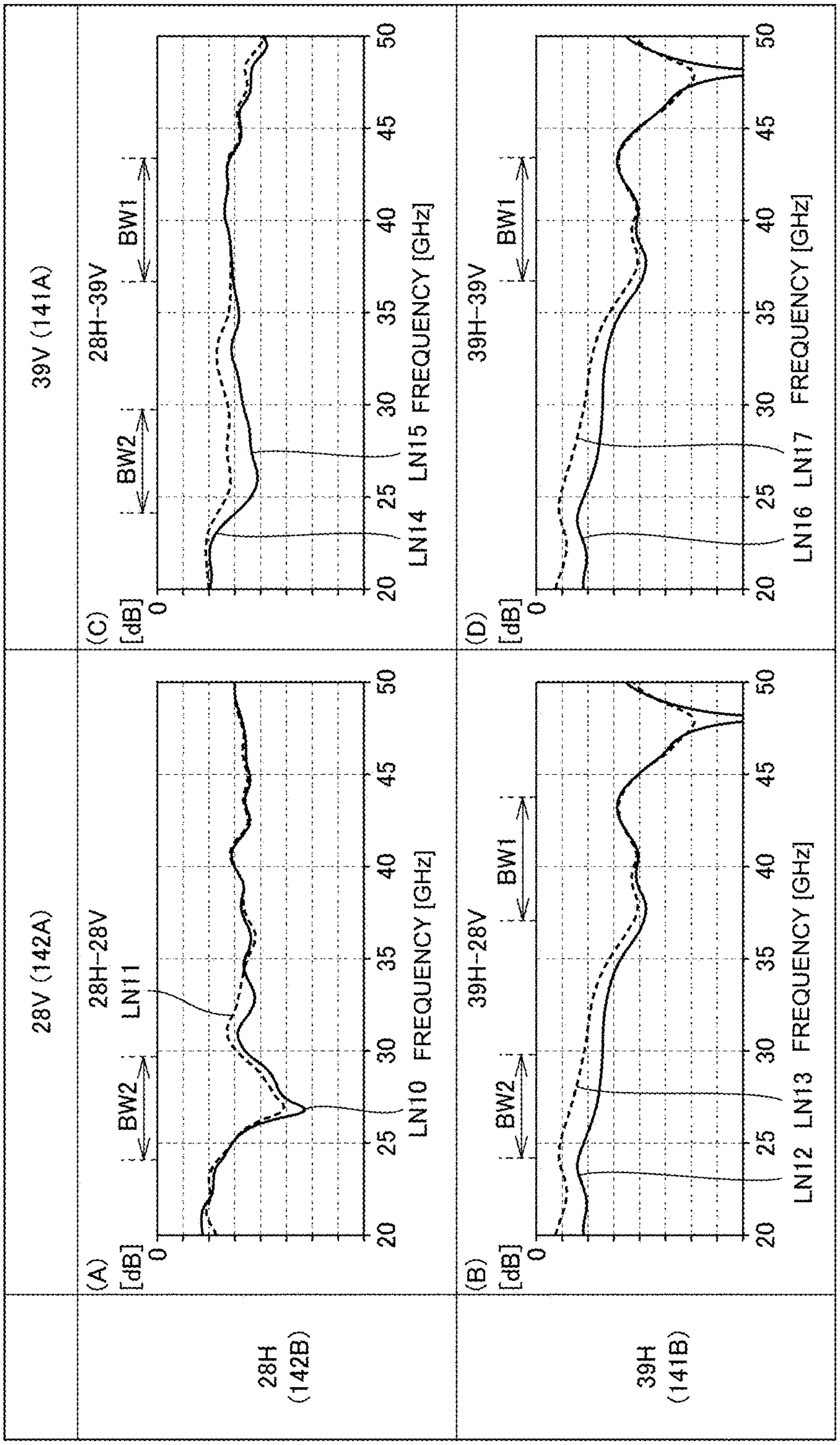
FIG. 6 includes graphs illustrating isolation characteristics between feed ports in the antenna modules according to Embodiment 1 and Comparative Example 1.

FIG. 6 includes graphs illustrating simulation results of isolation characteristics between feed ports in the antenna module 100 according to Embodiment 1 and the antenna module 100X according to Comparative Example 1. In each graph in FIG. 6, a solid line (LN10, LN12, LN14, LN16) indicates a case of the antenna module 100 according to Embodiment 1, and a dashed line (LN11, LN13, LN15, LN17) indicates a case of the antenna module 100X according to Comparative Example 1. In FIG. 6, note that feed ports corresponding to the feed lines 141A and 141B are respectively denoted by 39V and 39H and feed ports corresponding to the feed lines 142A and 142B are respectively denoted by 28V and 28H. Furthermore, a frequency band on a high frequency side is denoted by BW1, and a frequency band on a low frequency side is denoted by BW2.

Referring to FIG. 6, a graph (A) illustrates isolation characteristics between the low frequency-side feed lines 142A and 142B. In the graph (A), it can be seen that the isolation characteristics in the antenna module 100 according to Embodiment 1 are improved in comparison with those in the antenna module 100X according to Comparative Example 1 in the frequency band BW2 on the low frequency side.

A graph (B) illustrates isolation characteristics between the low frequency-side feed line 142A and the high frequency-side feed line 141B. Furthermore, a graph (C) illustrates isolation characteristics between the low frequency-side feed line 142B and the high frequency-side feed line 141A. In both the graphs (B) and (C), a little improvement effect is seen in the frequency band BW1, whereas the isolation characteristics in the antenna module 100 are improved in comparison with those in the antenna module 100X in both the frequency bands BW1 and BW2.

A graph (D) illustrates isolation characteristics between the high frequency-side feed lines 141A and 141B. In the graph (D) as well, the isolation characteristics in the antenna module 100 are improved in comparison with those in the antenna module 100X in the frequency band BW1 on the high frequency side.

As described above, in a stack-type dual-band, dual-polarization antenna module, a via electrode extending through an opening portion formed in a central portion of a low frequency-side radiating element and electrically connecting a high frequency-side radiating element and a ground electrode is provided, thereby enabling an improvement in isolation characteristics between different polarized waves in the same frequency band and a different frequency band.

Incidentally, although, in the antenna module 100, both the radiating elements 121 and 122 are of a dual-polarization type, they do not necessarily have to be of the dual-polarization type. Even in an antenna module in which each radiating element is of a single-polarization type, isolation characteristics can be improved as long as a polarization direction of a radio wave radiated from the radiating element 121 differs from a polarization direction of a radio wave radiated from the radiating element 122.

"Radiating elements 121 and 122" in Embodiment 1 respectively correspond to "first radiating element" and "second radiating element" in the present disclosure. "Feed lines 141A and 141B" in Embodiment 1 respectively correspond to "first feed line" and "third feed line" in the present disclosure. "Feed lines 142A and 142B" in Embodiment 1 respectively correspond to "second feed line" and "fourth feed line" in the present disclosure. In Embodiment 1, "positive direction of the Y axis" and "negative direction of the Y axis" respectively correspond to "first direction" and "fourth direction" in the present disclosure, and "negative direction of the X axis" and "positive direction of the X axis" respectively correspond to "second direction" and "third direction" in the present disclosure.

Modifications 1 to 3

Figure 7:
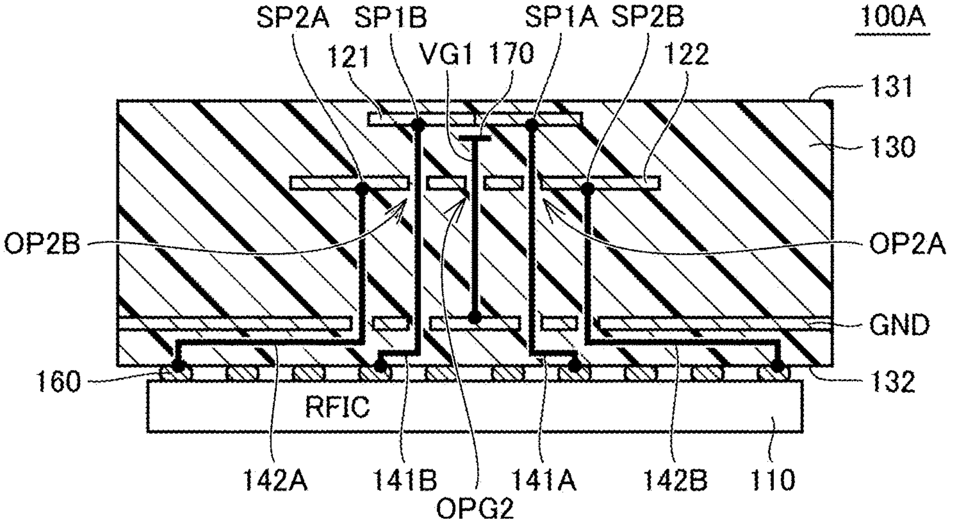
FIG. 7 is a side perspective view of an antenna module according to Modification 1.

In the antenna module 100 according to Embodiment 1, although the via electrode VG is directly connected to the radiating element 121, the via electrode VG and the radiating element 121 do not necessarily have to be directly connected to each other as long as they are electrically coupled to each other. FIG. 7 is a side perspective view of an antenna module 100A according to Modification 1. The antenna module 100A differs from the antenna module 100 according to Embodiment 1 illustrated in FIG. 4 in that the via electrode VG is replaced with a via electrode VG1, and all other components except for the via electrode VG1 are the same as those in FIG. 4. In FIG. 7, a repeated description of elements that are the same as those in FIG. 4 is not given.

The via electrode VG1 is not directly connected to the radiating element 121, but is capacitively coupled to the radiating element 121 via a flat-plate electrode 170 disposed opposite the radiating element 121.

Note that a position of the flat-plate electrode 170, that is, a position of the upper-side end portion (second end portion) of the via electrode VG1 may be the same position as the radiating element 122 or any position between the radiating element 122 and the radiating element 121 in the normal direction of the dielectric substrate 130. At this time, when viewed in plan from the normal direction of the dielectric substrate 130, the second end portion of the via electrode VG1 overlaps the opening portion OPG2 of the radiating element 122.

Figure 8:
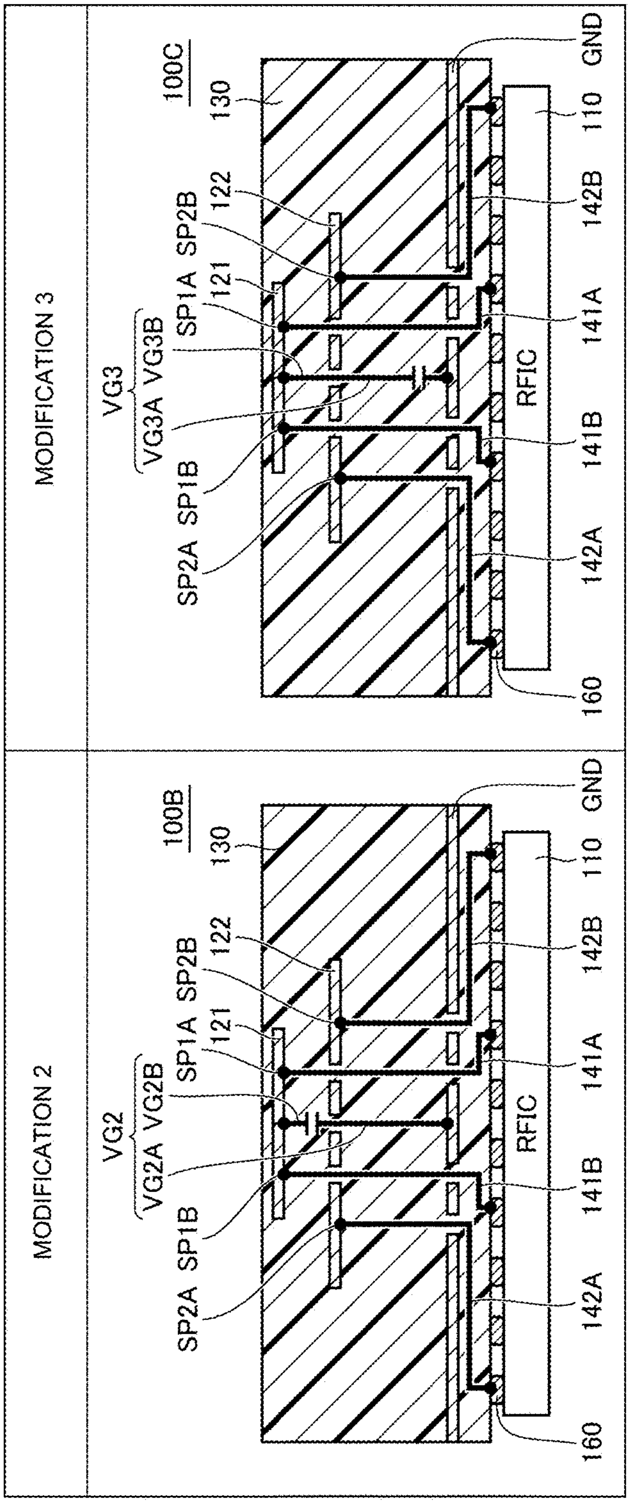
FIG. 8 includes side perspective views of antenna modules according to Modification 2 and Modification 3.

Furthermore, a position of capacitive coupling in the via electrode is not limited to a boundary portion with the radiating element 121. For example, as with an antenna module 100B according to Modification 2 and an antenna module 100C according to Modification 3 in FIG. 8, a via electrode may be divided at some point, and capacitive coupling may be provided at a portion where the division is made.

A via electrode VG2 in the antenna module 100B according to Modification 2 includes a first portion VG2A connected to the ground electrode GND, and a second portion VG2B connected to the radiating element 121. The first portion VG2A and the second portion VG2B are capacitively coupled to each other in a layer between the radiating element 121 and the radiating element 122.

A via electrode VG3 in the antenna module 100C according to Modification 3 includes a first portion VG3A connected to the ground electrode GND, and a second portion VG3B connected to the radiating element 121. The first portion VG3A and the second portion VG3B are capacitively coupled to each other in a layer between the radiating element 122 and the ground electrode GND.

Figure 9:
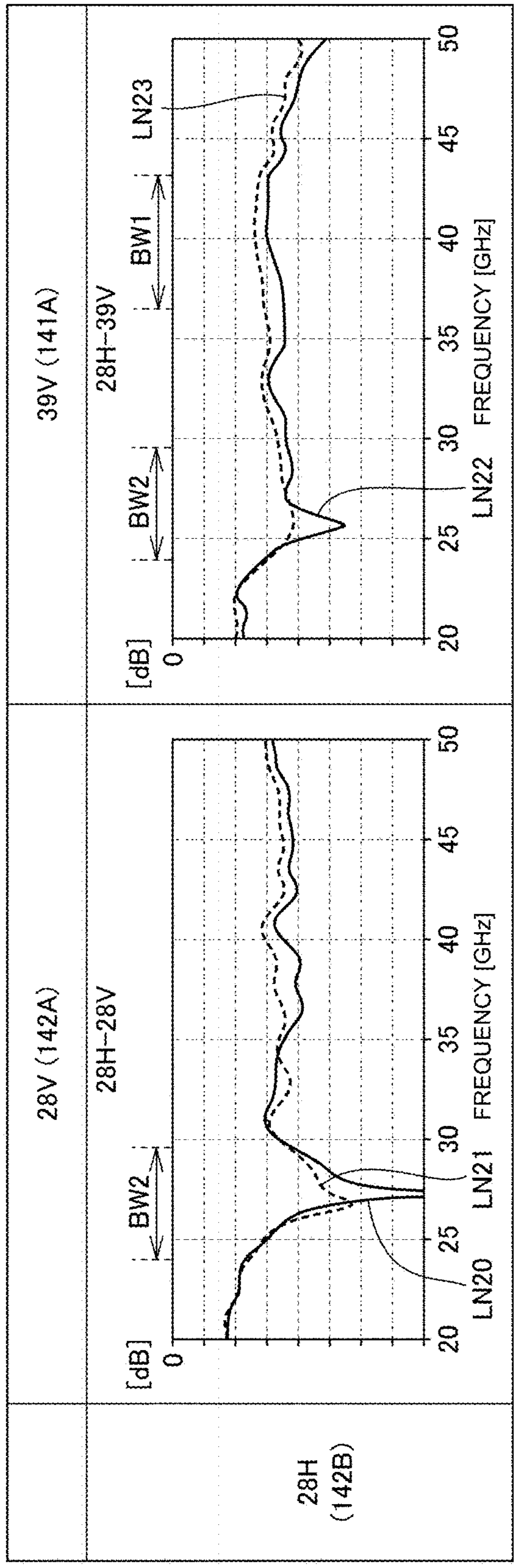
FIG. 9 includes graphs illustrating isolation characteristics in the antenna module according to Modification 2.

FIG. 9 includes graphs illustrating an example of isolation characteristics in the above-described antenna module 100B according to Modification 2. FIG. 9 illustrates isolation characteristics between the low frequency-side feed lines 142A and 142B and isolation characteristics between the low frequency-side feed line 142B and the high frequency-side feed line 141A in the antenna module 100B as compared with those in the antenna module 100 according to Embodiment 1. In FIG. 9, a solid line (LN20, LN22) indicates a case of the antenna module 100B according to Modification 2, and a dashed line (LN21, LN23) indicates a case of the antenna module 100 according to Embodiment 1.

As illustrated in FIG. 9, in the antenna module 100B according to Modification 2, the isolation characteristics between the feed lines 142A and 142B in the frequency band BW2 and the isolation characteristics between the feed lines

141A and 142B in the frequency bands BW1 and BW2 are improved in comparison with those in the antenna module 100 according to Embodiment 1.

As described above, even in a configuration in which a via electrode is partially capacitively coupled, when the via electrode extends through the opening portion OPG2 formed in the central portion of the radiating element 122, current concentrates at the edge portion of the opening portion OPG2 of the radiating element 122 as illustrated in FIG. 5, enabling an improvement in isolation characteristics between feed ports. Note that a phase of current that flows through the via electrode can change depending on the position of capacitive coupling in the via electrode. For that reason, the position of capacitive coupling suitable for improvement in isolation characteristics may differ depending on the frequency band of a radio wave to be radiated. In other words, when the position of capacitive coupling is set in accordance with the frequency band of a radio wave to be radiated, isolation characteristics can be adjusted.

Modification 4

In each embodiment described above, the via electrode extends in a straight line from the ground electrode GND toward the radiating element 121. In Modification 4, a configuration will be described in which vias in different layers that constitute the via electrode are offset between the ground electrode GND and the radiating element 121.

Figure 10:
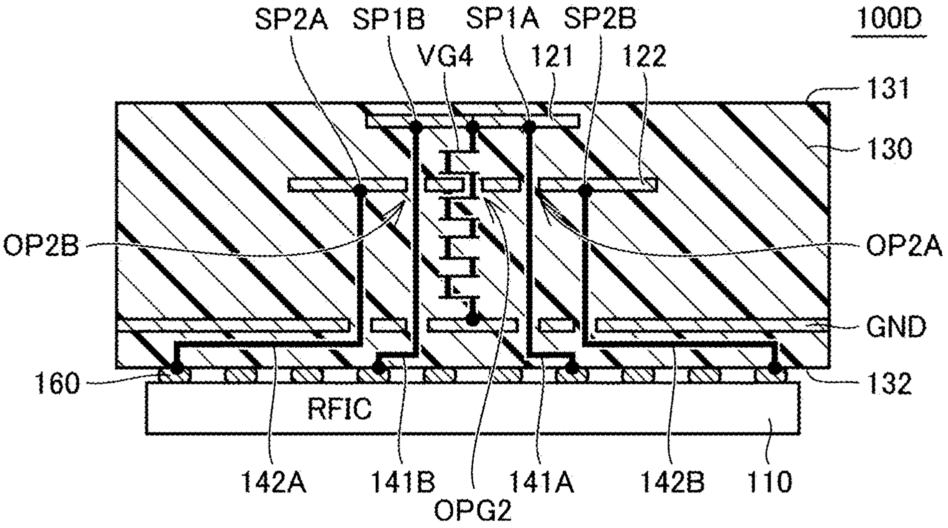
FIG. 10 is a side perspective view of an antenna module according to Modification 4.

FIG. 10 is a side perspective view of an antenna module 100D according to Modification 4. In the antenna module 100D, the via electrode VG in the antenna module 100 according to Embodiment 1 is replaced with a via electrode VG4, and all other components are the same as those in the antenna module 100. In FIG. 10, a repeated description of elements that are the same as those in FIG. 4 is not given.

Referring to FIG. 10, the via electrode VG4 includes a plurality of vias and a plurality of flat-plate electrodes in the form of strips that are disposed alternately. For that reason, when the antenna module 100D is viewed from the side, in the via electrode VG4, vias in different layers that constitute the via electrode VG4 are offset between the ground electrode GND and the radiating element 121. In other words, the via electrode VG4 is disposed so as to extend in a zigzag line from the ground electrode GND toward the radiating element 121. At this time, the path length of the via electrode VG4 can be changed by adjusting the length of each flat-plate electrode. When the path length of the via electrode VG4 is changed, an inductance value of the via electrode VG4 changes, and impedance changes. Thus, when the shape of the via electrode VG4 is changed in accordance with, for example, the frequency band of a radio wave to be radiated, isolation characteristics can be adjusted.

In FIG. 10, for ease of explanation of the structure of the via electrode VG4, note that the flat-plate electrodes in the via electrode VG4 are drawn so as to extend in a lateral direction (that is, a direction from the feed point SP1A toward the feed point SP1B) in FIG. 10. However, in a case where the antenna module 100D is of a dual-polarization type, to equalize the influence on two polarized waves, it is desirable that the direction in which the flat-plate electrodes of the via electrode VG4 extend be a direction to a position equidistant from the feed point SP1A and the feed point SP1B. In other words, it is desirable that the flat-plate electrodes of the via electrode VG4 extend in the direction of the arrow AR1 illustrated in FIG. 3.

Alternatively, in addition to a configuration in which the via electrode includes vias offset in two layers, a portion where partial capacitive coupling is provided may be provided in the via electrode as in Modifications 1 to 3, and isolation characteristics may be adjusted by changing a capacitance value together with an inductance value.

Figure 11:
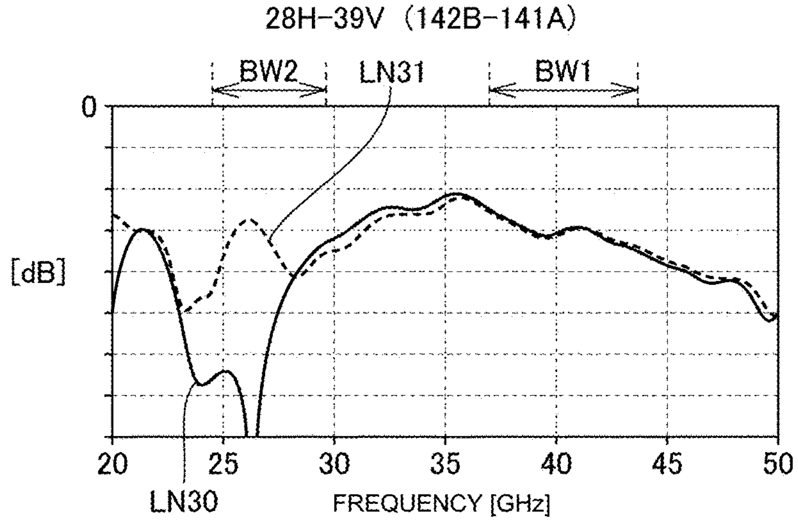
FIG. 11 is a graph illustrating isolation characteristics in the antenna module according to Modification 4.

FIG. 11 is a graph illustrating isolation characteristics in the antenna module 100D according to Modification 4. FIG. 11 illustrates, as an example, isolation characteristics between the high frequency-side feed line 141A and the low frequency-side feed line 142B. In FIG. 11, a solid line LN30 indicates a case of the antenna module 100D according to Modification 4, and a dashed line LN31 indicates a case of the antenna module 100 according to Embodiment 1.

As illustrated in FIG. 11, although both the antenna modules 100D and 100 are comparable in terms of isolation characteristics in the frequency band BW1 on the high frequency side, the isolation characteristics in the antenna module 100D according to Modification 4 are improved in comparison with those in the antenna module 100 in the frequency band BW2 on the low frequency side.

As described above, the configuration in which vias in different layers that constitute the via electrode are offset between the ground electrode GND and the radiating element 121 enables isolation characteristics to be improved in comparison with the case where the via electrode extends in a straight line.

Embodiment 2

In Embodiment 1 and Modifications 1 to 4, the configuration has been described in which two feed elements are disposed in a stacked configuration. In Embodiment 2 and Modification 5 to be described, a configuration will be described in which a parasitic element is disposed in a stacked configuration in addition to two feed elements.

Figure 12:
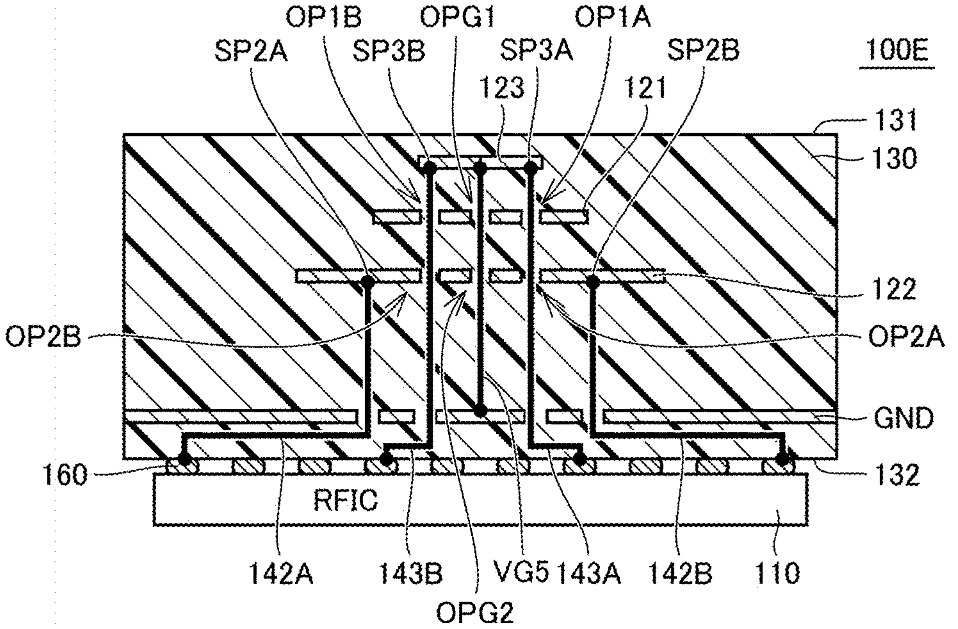
FIG. 12 is a side perspective view of an antenna module according to Embodiment 2.

FIG. 12 is a side perspective view of an antenna module 100E according to Embodiment 2. In the antenna module 100E, in addition to the antenna module 100 according to Embodiment 1, a radiating element 123 is further disposed closer to the upper surface 131 of the dielectric substrate 130 than the radiating element 121. Furthermore, in the antenna module 100E, feed lines 143A and 143B and a via electrode VG5 are provided in place of the feed lines 141A and 141B and the via electrode VG of the antenna module 100.

In the antenna module 100E, the radiating element 121 is a parasitic element, and the radiating element 123 is a feed element. In the radiating element 121, opening portions OPG1, OP1A, and OP1B are formed.

The feed line 143A extends through the opening portion OP2A of the radiating element 122 and the opening portion OP1A of the radiating element 121 from the RFIC 110 and is connected to a feed point SP3A of the radiating element 123. The feed line 143B extends through the opening portion OP2B of the radiating element 122 and the opening portion OP1B of the radiating element 121 from the RFIC 110 and is connected to a feed point SP3B of the radiating element 123. Furthermore, the via electrode VG5 extends through the opening portion OPG2 formed in the central portion of the radiating element 122 and the opening portion OPG1 formed in a central portion of the radiating element 121 and is electrically coupled to the center of the radiating element 123. Note that the via electrode VG5 may be capacitively coupled to the radiating element 123.

The size of the radiating element 123 is smaller than the size of the radiating element 121. Thus, when radio-frequency signals corresponding to a resonant frequency of the radiating element 123 are fed to the radiating element 123 via the feed lines 143A and 143B, radio waves in a higher frequency band than that of the radiating element 121 are radiated from the radiating element 123. Furthermore, when radio-frequency signals corresponding to a resonant frequency of the radiating element 121 are fed to the feed lines 143A and 143B, radio waves are radiated from the radiating element 121. In other words, the antenna module 100E can function as a triple-band antenna module capable of radiating radio waves in three different frequency bands (for example, 28 GHz, 39 GHz, and 60 GHz).

Incidentally, when the resonant frequency of the radiating element 123 is set to a frequency (for example, 46 GHz) that is slightly higher than the frequency band of the radiating element 121 and at which the radiating element 121 can also resonate, the frequency band of the radiating element 121 can be effectively expanded.

Furthermore, "radiating elements 121, 122, and 123" in Embodiment 2 respectively correspond to "third radiating element", "second radiating element", and "first radiating element" in the present disclosure. "Feed line 143A" and "feed line 143B" in Embodiment 2 respectively correspond to "first feed line" and "third feed line" in the present disclosure.

Modification 5

In Modification 5, a configuration will be described in which a parasitic element is disposed closer to the upper surface of the dielectric substrate than two feed elements.

Figure 13:
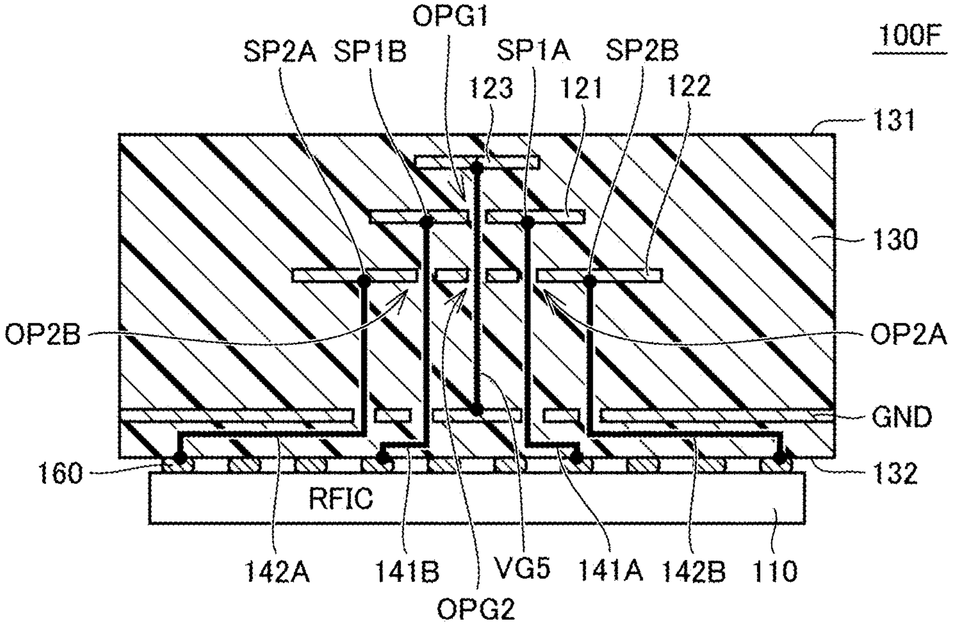
FIG. 13 is a side perspective view of an antenna module according to Modification 5.

FIG. 13 is a side perspective view of an antenna module 100F according to Modification 5. In the antenna module 100F, as with the antenna module 100E according to Embodiment 2, the radiating element 123 that is smaller in size than the radiating element 122 is further disposed closer to the upper surface 131 of the dielectric substrate 130 than the radiating element 121. In the antenna module 100F, however, the radiating elements 121 and 122 are feed elements, and the radiating element 123 is a parasitic element.

More specifically, in the radiating element 121, as with the antenna module 100 according to Embodiment 1, radio-frequency signals are fed to the feed points SP1A and SP1B via the feed lines 141A and 141B, respectively. Furthermore, in the radiating element 122, radio-frequency signals are fed to the feed points SP2A and SP2B via the feed lines 142A and 142B, respectively. The via electrode VG5 extends through the opening portion OPG2 formed in the central portion of the radiating element 122 and the opening portion OPG1 formed in the central portion of the radiating element 121 and is electrically coupled to the center of the radiating element 123.

In the case of the antenna module 100F, no radio-frequency signals can be fed to the radiating element 123 individually as in the antenna module 100E according to Embodiment 2. In the antenna module 100F, the size of the radiating element 123 is set to be slightly smaller than the size of the radiating element 121, and, when a radio-frequency signal is fed to the radiating element 121, the radiating element 123 is also configured to resonate. This enables the frequency band of the radiating element 121 to be expanded toward high frequencies.

Furthermore, "radiating elements 121, 122, and 123" in Modification 5 respectively correspond to "first radiating element", "second radiating element", and "fourth radiating element" in the present disclosure.

Aspects (1) An antenna module according to an aspect includes a dielectric substrate, a ground electrode disposed in the dielectric substrate, a flat-plate-shaped first radiating element, a flat-plate-shaped second radiating element, a first feed line, a second feed line, and a via electrode connected to the ground electrode. The first radiating element is disposed opposite the ground electrode in the dielectric substrate. The second radiating element is disposed between the first radiating element and the ground electrode. The first feed line extends through the second radiating element and transmits a radio-frequency signal to the first radiating element. The second feed line transmits a radio-frequency signal to the second radiating element. The first feed line is electrically coupled to the first radiating element at a position offset from a center of the first radiating element in a first direction. The second feed line is electrically coupled to the second radiating element at a position offset from a center of the second radiating element in a second direction different from the first direction. A size of the second radiating element is larger than a size of the first radiating element. An opening portion is formed in a central portion of the second radiating element. The via electrode extends through the opening portion of the second radiating element and is electrically coupled to a central portion of the first radiating element.

(2) In the antenna module according to (1), the via electrode is connected to the first radiating element.

(3) In the antenna module according to (1), the via electrode is capacitively coupled to the first radiating element.

(4) In the antenna module according to any one of (1) to (3), the via electrode includes a first portion connected to the ground electrode, and a second portion capacitively coupled to the first portion and disposed between the first portion and the first radiating element.

(5) In the antenna module according to any one of (1) to (4), in the via electrode, vias in different layers that constitute the via electrode are offset between the ground electrode and the first radiating element.

(6) The antenna module according to any one of (1) to (5) further includes a third feed line that extends through the second radiating element and transmits a radio-frequency signal to the first radiating element. The third feed line is electrically coupled to the first radiating element at a position offset from the center of the first radiating element in a third direction.

(7) The antenna module according to (6) further includes a fourth feed line that transmits a radio-frequency signal to the second radiating element. The fourth feed line is electrically coupled to the second radiating element at a position offset from the center of the second radiating element in a fourth direction different from the second direction.

(8) In the antenna module according to (7), when viewed in plan from a normal direction of the dielectric substrate, the center of the first radiating element and the center of the second radiating element overlap each other. The third direction is an opposite direction to the second direction with respect to the center of the first radiating element. The fourth direction is an opposite direction to the first direction with respect to the center of the first radiating element.

(9) In the antenna module according to (8), when viewed in plan from the normal direction of the dielectric substrate, the first direction is orthogonal to the third direction.

(10) The antenna module according to (1) further includes a flat-plate-shaped third radiating element disposed between the first radiating element and the second radiating element. The first feed line and the via electrode extend through the third radiating element and reach the first radiating element.

A size of the third radiating element is larger than the size of the first radiating element and is smaller than the size of the second radiating element.

(11) In the antenna module according to (1), the dielectric substrate has a first surface and a second surface facing each other. The ground electrode is disposed closer to the second surface than the first radiating element. The antenna module further includes a flat-plate-shaped fourth radiating element disposed closer to the first surface than the first radiating element. A size of the fourth radiating element is smaller than the size of the first radiating element.

(12) In the antenna module according to (11), the via electrode extends through the first radiating element and is electrically coupled to a central portion of the fourth radiating element.

(13) An antenna module according to an aspect includes a dielectric substrate, a ground electrode disposed in the dielectric substrate, a flat-plate-shaped first radiating element, a flat-plate-shaped second radiating element, a first feed line, a second feed line, and a via electrode connected to the ground electrode. The first radiating element is disposed opposite the ground electrode in the dielectric substrate. The second radiating element is disposed between the first radiating element and the ground electrode. The first feed line extends through the second radiating element and transmits a radio-frequency signal to the first radiating element. The second feed line transmits a radio-frequency signal to the second radiating element. The first feed line is electrically coupled to the first radiating element at a position offset from a center of the first radiating element in a first direction. The second feed line is electrically coupled to the second radiating element at a position offset from a center of the second radiating element in a second direction different from the first direction. A size of the second radiating element is larger than a size of the first radiating element. An opening portion is formed in a central portion of the second radiating element. The via electrode extends through the opening portion of the second radiating element.

(14) An antenna module according to an aspect includes a dielectric substrate, a ground electrode disposed in the dielectric substrate, a flat-plate-shaped first radiating element, a flat-plate-shaped second radiating element, a first feed line, a second feed line, and a via electrode having a first end portion and a second end portion. The first radiating element is disposed opposite the ground electrode in the dielectric substrate. The second radiating element is disposed between the first radiating element and the ground electrode. The first feed line extends through the second radiating element and transmits a radio-frequency signal to the first radiating element. The second feed line transmits a radio-frequency signal to the second radiating element. The first feed line is electrically coupled to the first radiating element at a position offset from a center of the first radiating element in a first direction. The second feed line is electrically coupled to the second radiating element at a position offset from a center of the second radiating element in a second direction different from the first direction. A size of the second radiating element is larger than a size of the first radiating element. An opening portion is formed in a central portion of the second radiating element. The first end portion of the via electrode is connected to the ground electrode. The second end portion of the via electrode is in a position of the second radiating element or in a position between the second radiating element and the first radiating element in a normal direction of the dielectric substrate. When viewed in plan from the normal direction of the dielectric substrate, the second end portion overlaps the opening portion.

(15) The antenna module according to any one of (1) to (14) further includes a feed device that feeds a radio-frequency signal to the first radiating element and the second radiating element.

(16) A communication device according to an aspect includes the antenna module according to any one of (1) to (15).

The embodiments disclosed here are to be considered to be illustrative and not restrictive in any respect. The scope of the present invention is defined not by the above description of the embodiments, but by the claims, and is intended to include all changes made within the meaning and scope equivalent to the claims.

REFERENCE SIGNS LIST

10 communication device, 100, 100A to 100F, 100X antenna module, 110 RFIC, 110A to 110D feed circuit, 111A to 111D, 113A to 113D, 117 switch, 112AR to 112DR low noise amplifier, 112AT to 112DT power amplifier, 114A to 114D attenuator, 115A to 115D phase shifter, 116 signal combiner/splitter, 118 mixer, 119 amplifier circuit, 120 antenna device, 121 to 123 radiating element, 125 antenna element, 130 dielectric substrate, 131 upper surface, 132 lower surface, 141A to 143A, 141B to 143B feed line, 160 solder bump, 170 flat-plate electrode, 200 BBIC, BW1, BW2 frequency band, GND ground electrode, OP1A, OP1B, OP2A, OP2B, OPG1, OPG2 opening portion, SP1A to SP3A, SP1B to SP3B feed point, VG, VG1 to VG5 via electrode, VG2A, VG3A first portion, VG2B, VG3B second portion

The invention claimed is:

1. An antenna module comprising:

a dielectric substrate;

a ground electrode disposed in the dielectric substrate;

a flat-plate-shaped first radiating element disposed opposite the ground electrode in the dielectric substrate;

a flat-plate-shaped second radiating element disposed between the first radiating element and the ground electrode;

a first feed line extending through the second radiating element and configured to convey radio-frequency signals to the first radiating element;

a second feed line configured to convey radio-frequency signals to the second radiating element; and a via electrode connected to the ground electrode, wherein the first feed line is electrically coupled to the first radiating element at a position offset in a first direction from a center of the first radiating element, wherein the second feed line is electrically coupled to the second radiating element at a position offset in a second direction different from the first direction with respect to a center of the second radiating element, wherein a size of the second radiating element is larger than a size of the first radiating element, wherein an opening portion is formed in a central portion of the second radiating element, and wherein the via electrode extends through the opening portion of the second radiating element and is electrically coupled to a central portion of the first radiating element.

2. The antenna module according to claim 1, wherein the via electrode is connected to the first radiating element.

3. The antenna module according to claim 1, wherein the via electrode is capacitively coupled to the first radiating element.

4. The antenna module according to claim 1,
wherein the via electrode includes
a first portion connected to the ground electrode, and
a second portion capacitively coupled to the first portion and disposed between the first portion and the first radiating element.

5. The antenna module according to claim 1,
wherein, in the via electrode, vias in different layers that constitute the via electrode are offset between the ground electrode and the first radiating element.

6. The antenna module according to claim 1, further comprising:
a third feed line extending through the second radiating element and configured to convey radio-frequency signals to the first radiating element,
wherein the third feed line is electrically coupled to the first radiating element at a position offset in a third direction different from the first direction with respect to the center of the first radiating element.

7. The antenna module according to claim 5, further comprising:
a third feed line extending through the second radiating element and configured to convey radio-frequency signals to the first radiating element,
wherein the third feed line is electrically coupled to the first radiating element at a position offset in a third direction different from the first direction with respect to the center of the first radiating element.

8. The antenna module according to claim 6, further comprising:
a fourth feed line configured to convey radio-frequency signals to the second radiating element,
wherein the fourth feed line is electrically coupled to the second radiating element at a position offset in a fourth direction different from the second direction with respect to the center of the second radiating element.

9. The antenna module according to claim 7, further comprising:
a fourth feed line configured to convey radio-frequency signals to the second radiating element,
wherein the fourth feed line is electrically coupled to the second radiating element at a position offset in a fourth direction different from the second direction with respect to the center of the second radiating element.

10. The antenna module according to claim 8,
wherein, when viewed in plan from a normal direction of the dielectric substrate, the center of the first radiating element and the center of the second radiating element overlap each other,
wherein the third direction is an opposite direction to the second direction with respect to the center of the first radiating element, and
wherein the fourth direction is an opposite direction to the first direction with respect to the center of the first radiating element.

11. The antenna module according to claim 10,
wherein, when viewed in plan from the normal direction of the dielectric substrate, the first direction is orthogonal to the third direction, and the second direction is orthogonal to the fourth direction.

12. The antenna module according to claim 1, further comprising:
a flat-plate-shaped third radiating element disposed between the first radiating element and the second radiating element,
wherein the first feed line and the via electrode extend through the third radiating element and reach the first radiating element, and
wherein a size of the third radiating element is larger than the size of the first radiating element and is smaller than the size of the second radiating element.

13. The antenna module according to claim 1,
wherein the dielectric substrate has a first surface and a second surface that face each other,
wherein the ground electrode is disposed closer to the second surface than the first radiating element,
wherein the antenna module further comprises a flat-plate-shaped fourth radiating element disposed closer to the first surface than the first radiating element, and
wherein a size of the fourth radiating element is smaller than the size of the first radiating element.

14. The antenna module according to claim 13,
wherein the via electrode extends through the first radiating element and is electrically coupled to a central portion of the fourth radiating element.

15. An antenna module comprising:
a dielectric substrate;
a ground electrode disposed in the dielectric substrate;
a flat-plate-shaped first radiating element disposed opposite the ground electrode in the dielectric substrate;
a flat-plate-shaped second radiating element disposed between the first radiating element and the ground electrode;
a first feed line extending through the second radiating element and configured to convey radio-frequency signals to the first radiating element;
a second feed line configured to convey radio-frequency signals to the second radiating element; and
a via electrode connected to the ground electrode,
wherein the first feed line is electrically coupled to the first radiating element at a position offset in a first direction from a center of the first radiating element,
wherein the second feed line is electrically coupled to the second radiating element at a position offset in a second direction different from the first direction with respect to a center of the second radiating element,
wherein a size of the second radiating element is larger than a size of the first radiating element,
wherein an opening portion is formed in a central portion of the second radiating element, and
wherein the via electrode extends through the opening portion of the second radiating element.

16. An antenna module comprising:
a dielectric substrate;
a ground electrode disposed in the dielectric substrate;
a flat-plate-shaped first radiating element disposed opposite the ground electrode in the dielectric substrate;
a flat-plate-shaped second radiating element disposed between the first radiating element and the ground electrode;
a first feed line extending through the second radiating element and configured to convey radio-frequency signals to the first radiating element;
a second feed line configured to convey radio-frequency signals to the second radiating element; and
a via electrode having a first end portion and a second end portion,
wherein the first feed line is electrically coupled to the first radiating element at a position offset in a first direction from a center of the first radiating element,
wherein the second feed line is electrically coupled to the second radiating element at a position offset in a second direction different from the first direction with respect to a center of the second radiating element, wherein a size of the second radiating element is larger than a size of the first radiating element, wherein an opening portion is formed in a central portion of the second radiating element, wherein the first end portion of the via electrode is connected to the ground electrode, wherein the second end portion of the via electrode is in a position of the second radiating element or in a position between the second radiating element and the first radiating element in a normal direction of the dielectric substrate, and wherein, when viewed in plan from the normal direction of the dielectric substrate, the second end portion overlaps the opening portion.

17. The antenna module according to claim 1, further comprising:

a feed device configured to feed a radio-frequency signal to the first radiating element and the second radiating element.

18. A communication device comprising:

the antenna module according to claim 1.

19. A communication device comprising:

the antenna module according to claim 15.

20. A communication device comprising:

the antenna module according to claim 16.

* * * * *